US011914877B2

(12) United States Patent
Talmor et al.

(10) Patent No.: US 11,914,877 B2
(45) Date of Patent: Feb. 27, 2024

(54) MANAGING ACCESS TO BLOCK STORAGE IN CLOUD COMPUTING ENVIRONMENTS

(71) Applicant: RED HAT, INC., Raleigh, NC (US)

(72) Inventors: Avraham Talmor, Rishon Letzion (IL); Ilan Gersht, Bat Yam (IL); Arie Bregman, Gan Yavne (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/513,300

(22) Filed: Oct. 28, 2021

(65) Prior Publication Data
US 2023/0136843 A1 May 4, 2023

(51) Int. Cl.
*G06F 3/06* (2006.01)
(52) U.S. Cl.
CPC ............ *G06F 3/064* (2013.01); *G06F 3/0604* (2013.01); *G06F 3/0622* (2013.01); *G06F 3/0659* (2013.01); *G06F 3/067* (2013.01)
(58) Field of Classification Search
CPC ...... G06F 3/064; G06F 3/0604; G06F 3/0622; G06F 3/0659; G06F 3/067
See application file for complete search history.

(56) References Cited

U.S. PATENT DOCUMENTS

| 2008/0163210 | A1* | 7/2008 | Bowman | G06F 9/4843 |
| | | | | 718/1 |
| 2014/0143543 | A1* | 5/2014 | Aikas | H04L 9/0894 |
| | | | | 713/168 |
| 2018/0203641 | A1* | 7/2018 | Petrocelli | H04L 67/1097 |
| 2020/0183585 | A1* | 6/2020 | Williams | G06F 3/0607 |

FOREIGN PATENT DOCUMENTS

CN 108243175 A * 7/2018 ............. H04L 63/10

* cited by examiner

*Primary Examiner* — Michelle T Bechtold
(74) *Attorney, Agent, or Firm* — Lowenstein Sandler LLP

(57) ABSTRACT

Systems and methods for managing access to a block device. An example method includes receiving, by a processing device from an entity operating in a cloud-computing environment, a memory access command referencing a block device of a distributed storage system that is accessible by a plurality of entities of the cloud computing environment; identifying a data structure associated with the referenced block device, wherein the data structure identifies entities of the cloud-computing environment that are allowed access to the block device; determining, in view of the data structure, whether the entity is allowed access to the block device by the memory access command; and responsive to determining that the entity is allowed access to the block device by memory access command, executing the memory access command.

20 Claims, 7 Drawing Sheets

| INDEX METADATA TABLE 300 | | | | | |
|---|---|---|---|---|---|
| EE ID | 1st LVL Access | Write Access | Read Access | Erase Access | Modify Access |
| EE 305 | Yes | Yes | Yes | Yes | Yes |
| EE 310 | Yes | No | Yes | No | No |
| EE 315 | No | N/A | N/A | N/A | N/A |

FIG. 3

MANAGING ACCESS TO BLOCK STORAGE IN CLOUD COMPUTING ENVIRONMENTS

TECHNICAL FIELD

The implementations of the disclosure generally relate to computer systems and, more specifically, to managing access to block storage in cloud computing environments.

BACKGROUND

Platform-as-a-Service (PaaS) system offerings can include software and/or hardware facilities for facilitating the execution of applications (web applications, mobile applications, etc.) in a cloud computing environment (the "cloud"). Cloud computing is a computing paradigm in which a user engages a "cloud provider" to execute a program on computer hardware owned and/or controlled by the cloud provider. A cloud provider can make virtual machines (VMs) hosted on its computer hardware available to customers for this purpose. The cloud provider can provide an interface that a user can use to requisition virtual machines and associated resources such as security policies, processors, storage, and network services, etc., as well as an interface to install and execute the user's applications and files on the virtual machines.

PaaS offerings can facilitate deployment of web applications without the cost and complexity of buying and managing the underlying hardware and software and provisioning hosting capabilities, providing the facilities to support the complete life cycle of building and delivering web applications and services entirely available from the Internet.

BRIEF DESCRIPTION OF THE DRAWINGS

The present disclosure is illustrated by way of example, and not by way of limitation, and can be more fully understood with reference to the following detailed description when considered in connection with the figures in which:

FIG. 3 schematically illustrates example metadata maintained by the access manager, in accordance with one or more aspects of the present disclosure.

DETAILED DESCRIPTION

Figure 1:
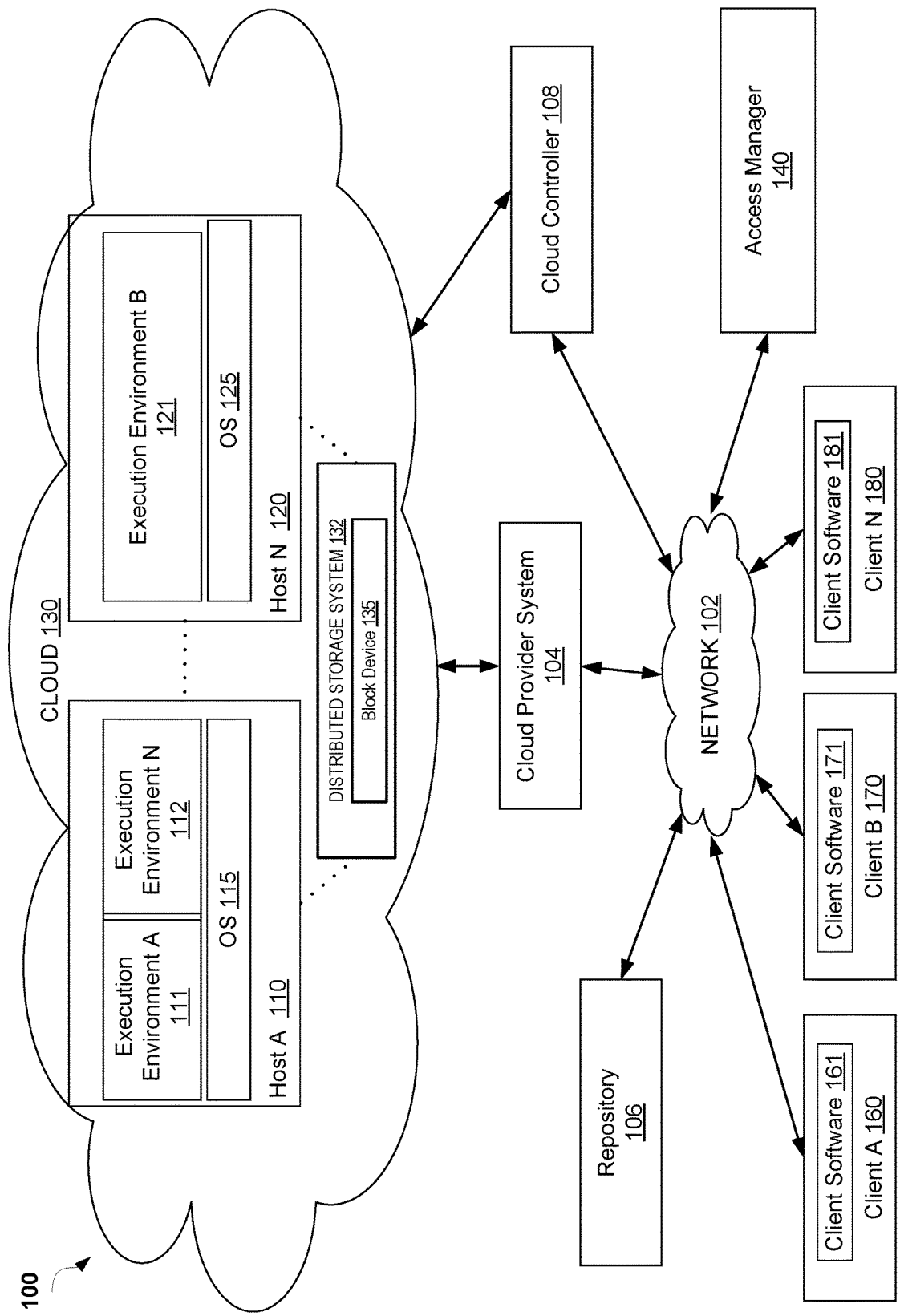
FIG. 1 depicts a high-level component diagram of an example computer system architecture, in accordance with one or more aspects of the present disclosure.

Described herein are methods and systems for limiting access to block storage in cloud computing environments. Cloud computing environments provide various advantages over locally owned computing systems. A cloud computing environment provides a platform that allows users to build applications and services in a cloud. For example, cloud computing environments can optimize resources by sharing them across multiple users and multiple clients, thereby reducing costs otherwise dedicated to procuring and maintaining local hardware. Additionally, cloud computing environments provide improved scalability for clients. Instead of purchasing additional local computing resources, supporting more data storage and buying more software licenses to support growth in the business, users can rent more storage space, acquire more bandwidth and increase access to software programs which are controlled by a cloud computing provider. A cloud provider can provision execution environments, such as virtual machines (VMs), hosted on its computer hardware available to customers, and provide the client with an interface and tools for installing and executing computing resources (e.g., applications, computer services, configuration files, etc.) on the VM.

Distributed storage systems often incorporate the features of distributed data stores and enable multiple clients to access and modify data of the distributed storage system. The distributed data stores may enhance performance of a computer system, reliability of the computer system, or a combination thereof. The distributed data stores may include a set of physical devices, virtual devices, or a combination thereof. Data may be stored at block-based repositories (e.g., block devices), file-based repositories (e.g., files and directories), object-based repositories (e.g., object-based buckets and containers), other repositories, or a combination thereof. A block-based repository divides a file into singular units of data and stores these units as separate data entities within block devices. Each data entity (e.g., a block) has a different address, so they may be stored at different block devices, as opposed to a file structure. A block device refers to a computer data storage device that supports reading data in large, fixed-size blocks, sectors, or clusters, as opposed to a small number of bytes at a time.

Cloud computing environments, however, can present challenges with multiple users having access to the same block device. For example, one user may request to read a file stored at a location of the block device that has, unbeknownst to the user, been recently modified or overwritten by a different user. This may cause loss of data, production issues, and confusion for the users of a shared cloud computing environment.

Aspects of the present disclosure address the above noted and other deficiencies by implementing a system capable of limiting user access to block storage (e.g., to a block device) in cloud computing environments. In particular, an access manager used by the present system may provide enable a client device to set rules regarding access to a block device. The rules may include a first level access list that identifies entities (e.g., execution environments, hosts, client device) of a cloud-computing environment that are allowed to access the block device (e.g., a whitelist) or which entities are restricted from accessing the block device (e.g., a blacklist). Alternatively, instead of a using a blacklist or whitelist, the first level access list may include each added entity along with an indicator indicative of whether the entity is granted access to the block device and/or restricted from accessing the block device. The indicator may be metadata maintained in rules data structure, a flag (e.g., a bit set to a value of 1 to indicate that the entity is allowed access to the block device and set to a value of 0 to indicate that the entity is denied access to the block device, of vice-versa), etc.

The rules may further include a second level access list that includes which type of memory access commands each entity on the first level access list is allowed to perform. Types of memory access commands may include read commands, write commands, erase commands, modify commands, etc. For example, for each entity allowed access to the block device, a data structure may maintain metadata indicative of the type of memory commands the entity is allowed to perform on the block device. As an illustrative example, a first execution environment may be allowed access to the block device, and allowed to perform any type of memory command (e.g., write, read, erase, and modify), a second execution environment may be allowed access to the block device, but only allowed to perform read commands on the block device, and a third execution environment may be restricted from accessing the block device. The first and second level access lists are discussed as two separate lists as an exemplary embodiment. In other embodiments, the first and second level access lists may be a single access list where, for a given entity, the access list may indicate whether the entity has access by indicating the allowed access types of the entity.

To enforce the rules, the access manager may listen to network traffic for memory access commands issued and/or received by an execution environment, a host, or a client that refers to an address range associated with the block device. For example, the access manager may monitor for the memory access commands using a filter, a packet sniffer, a resource monitoring tool, a file system mount point, etc. Responsive to detecting a memory access command associated with a block device, the access manager may determine (using the first level access list) whether the entity that issued the command has permission to access the block device, and, if so, may also determine (using the second level access list) what type of access (e.g., read, write, modify, erase) the entity is allowed.

Accordingly, aspects of the present disclosure enable the management of access to a block device shared by multiple entities using a cloud computing environment, thus preventing multiple users from using the same memory space and inadvertently overwriting data.

Various aspects of the above referenced methods and systems are described in details herein below by way of examples, rather than by way of limitation. The examples provided below discuss managing access, of multiple entities, to a block device.

FIG. 1 is a block diagram of a network architecture 100 in which implementations of the disclosure may operate. In some implementations, the network architecture 100 may be used in a containerized computing services platform. As discussed above, a containerized computing services platform may include a Platform-as-a-Service (PaaS) system, such as OpenShift® or Kubernetes®. The PaaS system provides resources and services (e.g., micro-services) for the development and execution of applications owned or managed by multiple users. A PaaS system provides a platform and environment that allow users to build applications and services in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the network architecture 100 includes a cloud-computing environment 130 (also referred to herein as a cloud) that includes distributed storage system 132 and execution environments 111, 112, 121 to execute applications and/or processes associated with the applications. An "execution environment" providing computing functionality may provide the execution environment for an application of the PaaS system. In some implementations, the "execution environment" may refer to a virtual machine (VM) that is hosted on a physical machine, such as host 110 through host 120, implemented as part of the cloud 130. For example, execution environments 111 and 112 are hosted on physical machine of host 110 in cloud 130 provided by cloud provider 104. In some implementations, an environment other than a VM may be used to execute functionality of the PaaS applications. When execution environment 111, 112, 121 are implemented as VMs, they may be executed by operating systems (OSs) 115, 125 on each host machine 110, 120.

In some implementations, the host machines 110, 120 are often located in a data center. Users can interact with applications executing on the cloud-based execution environments 111, 112, 121 using client computer systems, such as clients 160, 170 and 180, via corresponding client software 161, 171 and 181. Client software 161, 171, 181 may include an application such as a web browser. In other implementations, the applications may be hosted directly on hosts A through N 110, 120 without the use of VMs (e.g., a "bare metal" implementation), and in such an implementation, the hosts themselves are referred to as "execution environments".

Distributed storage system 132 may store and manage the distribution of data across multiple storage nodes and may provide access to data via a storage interface (not pictured). A block-based storage service may provide access to data at a block level and may be similar to one or more block level storage devices (e.g., Storage Area Network (SAN) device or array). An object-based storage may provide access to immutable data objects using an object-based gateway (e.g., a RESTful web service interface). A file-based storage service may provide access to data at a file and directory level and may be similar to file level storage devices (e.g., Network Attached Storage (NAS) devices). In one example, distributed storage system 132 may be the same or similar to Ceph, Gluster, Oracle® Automatic Storage Management (e.g., ASM), Hadoop® Distributed File System (HDFS), Andrew File System (AFS), Google® File System (GFS), other data storage system, or a combination thereof that is capable of storing object data (e.g. content) on one or more storage nodes.

Distributed storage system 132 may include one or more block devices 135 that represent block-based storage for storing mutable data objects within distributed storage system 132. In an implementation, block-based storage interfaces may be used to store data within media devices such as hard disks, CDs, floppy disks, and a combination thereof. Block devices 135 may store data over multiple object storage daemons (OSDs) within a storage cluster. In certain implementations, block device 135 may leverage the reliable autonomic distributed object store (RADOS) capabilities such as snapshot creation, replication, and fault-tolerance. RADOS is an open source object storage service that may be an integral part of distributed storage system 132 (e.g., Ceph storage system). In such instances, a RADOS block device (RBD) interface may interact with storage nodes to store and retrieve data using kernel modules.

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In various implementations, developers, owners, and/or system administrators of the applications may maintain applications executing in cloud 130 by providing software development services, system administration services, or other related types of configuration services for associated execution environments in cloud 130. This can be accomplished by accessing cloud 130 using an application programmer interface (API) within the applicable cloud service provider system 104. In some implementations, a developer, owner, or system administrator may access the cloud service provider system 104 from a client device (e.g., clients 160, 170, and 180) that includes dedicated software to interact with various cloud components. Additionally, or alternatively, the cloud service provider system 104 may be accessed using a web-based or cloud-based application that executes on a separate computing device that communicates with a client device via network 102.

In one implementation, the cloud provider system 104 is coupled to a cloud controller 108 via the network 102. The cloud controller 108 may reside on one or more machines (e.g., server computers, desktop computers, etc.) and may manage the execution of computing resources in the cloud 130. In some implementations, cloud controller 108 receives commands from duplication manager 140. In view of these commands, the cloud controller 108 provides data, to the cloud provider system 104, such as a copy list, configuration data, and configuration parameters associated with different execution environments or computing resources executing on said execution environments. In some implementations, the data may be provided to the cloud provider 104 and stored in a data repository 106, in a data repository (not shown) located on each host 110, 120, or in a data repository (not shown) located on each execution environment 111, 112, 121. This data may be used for copying a computing resource from a source execution environment to a destination execution environment. For example, the data may be used to copy an application or a service from execution environment A 111 to execution environment B 121.

In some implementations, access manager 140 implements block device access management for the cloud-based PaaS system described above. While aspects of the present disclosure describe access manager 140 as implemented in a PaaS environment, it should be noted that in other implementations, access manager 140 may also be implemented in an Infrastructure-as-a-Service (Iaas) environment. Additionally, while for simplicity of illustration, FIG. 1 depicts a single cloud 130, aspects of the present disclosure may be implemented to manage access to block devices across multiple clouds 130. In such execution environments, the access manager 140 may manage access to block devices in hybrid cloud environments, multi-cluster cloud environments, or the like. Furthermore, in some embodiments, access manager 140 may be a component of cloud 130. Access manager 140 is described in further detail below with respect to FIG. 2.

Figure 2:
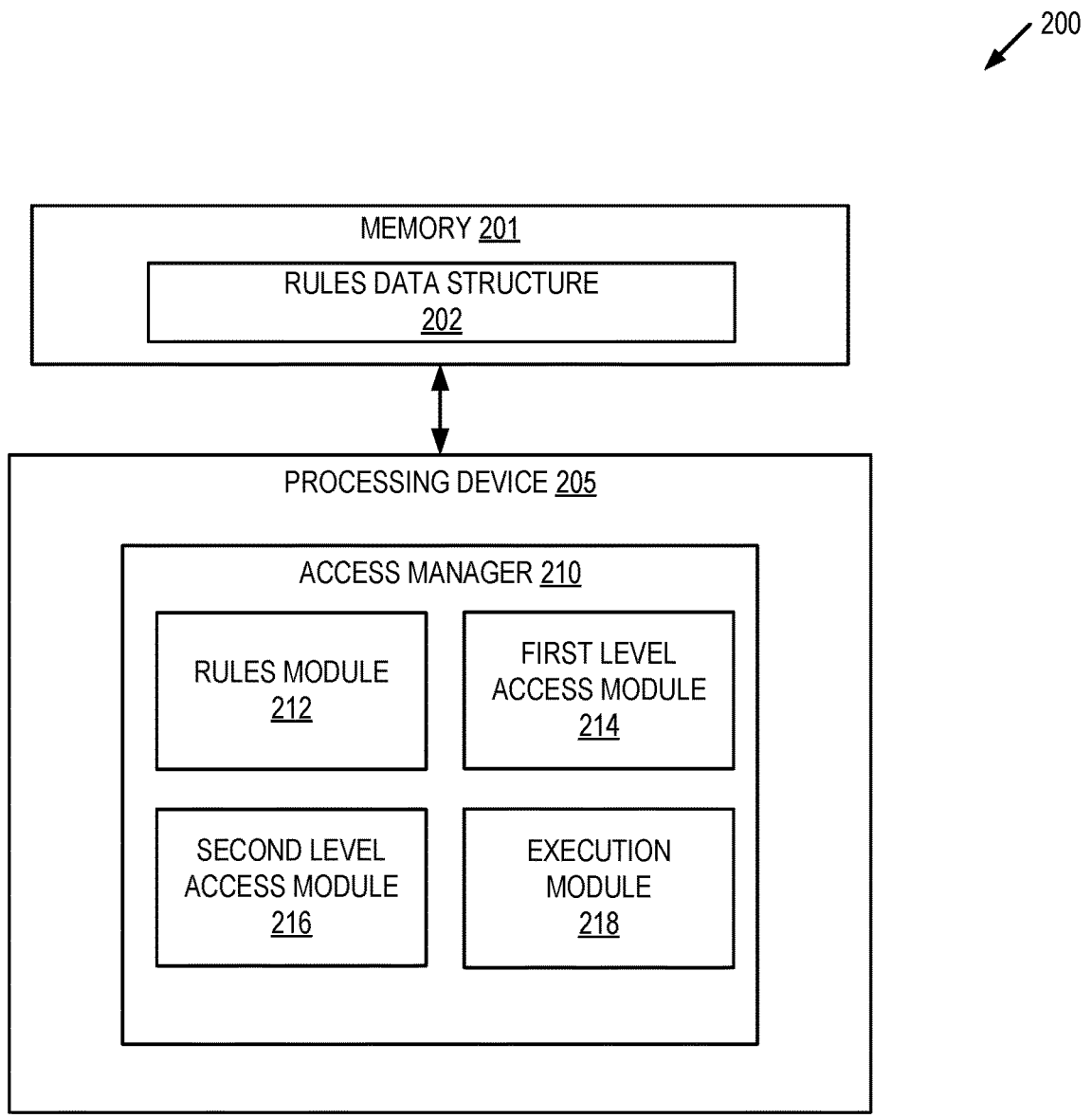
FIG. 2 depicts a block diagram illustrating an example of a duplication manager, in accordance with one or more aspects of the present disclosure.

FIG. 2 depicts a block diagram illustrating an example of access manager 210 for managing access to a block device of a cloud-computing environment. In some implementations, access manager 210 may correspond to access manager 140 of FIG. 1. As shown in FIG. 2, access manager 210 may be a component of a computing apparatus 200 that includes a processing device 205, operatively coupled to a memory 201, to execute access manager 210. In some implementations, processing device 205 and memory 201 may correspond to processing device 702 and main memory 704 respectively as described below with respect to FIG. 7.

Access manager manager 210 may include rules module 212, first level access module 214, second level access module 216, and execution module 218. Alternatively, the functionality of one or more of rules module 212, first level access module 214, second level access module 216, and execution module 218 may be combined into a single module or divided into multiple sub-modules. Memory 201 may include rules data structure 202. In some embodiments, first level access module 214 and the second level access module 216 may be a single module that maintains a single access list where, for a given entity, the access list may indicate whether the entity has access by indicating the allowed access types of the entity.

Rules module 212 may enable a client (e.g., client 160, 170, 180) to set rules regarding access to a block device (e.g., block device 135). In some embodiments, the rules may include a first level access list that includes which entities of a cloud-computing environment (e.g., cloud-computing environment 130) may access the block device (e.g., a whitelist) and/or which entities are restricted from accessing the block device (e.g., a blacklist). An entity may include an execution environments (e.g., execution environment 111, 112, 121), a host (e.g., host 110, 120), a client (e.g., client 160, 170, 180), etc. The first level access list may be generated via input from the client. The first level access list may be maintained by rules module 212 and stored on rules data structure 202. In some embodiments, instead of a using a blacklist or whitelist, the first level access list may include, for each entity, an indicator indicative of whether the entity is granted access to the block device and/or restricted from accessing the block device. In some embodiments, the indicator may be metadata maintained in rules data structure 202. In some embodiments, the indicator may be a flag (e.g., a bit set to a value of 1 to indicate that the entity is allowed access to the block device and set to a value of 0 to indicate that the entity is denied access to the block device, of vice-versa).

In an example, rules module 212 can display, on the client via a graphical user interface (GUI), a list of the clients of a cloud-computing environment, a list of the execution environments of the cloud-computing environment, a list of the hosts (e.g., host 110, 120) of the cloud-computing environment, or any combination thereof. To generate these list(s), rules module 212 may query to retrieve, from a data structure stored in memory 201 (not shown) or from cloud provider system 104, a list of execution environments and/or hosts currently running on the cloud-computing environment, a list of the clients currently connected to the cloud-computing environment, etc. A data structure may be a collection of data values, the relationships among them, and the functions or operations that can be applied to the data values. The data structure may be update each time an execution environment and/or host is installed or executed on (or removed from) the cloud-computing environment, each time a client is connected to or disconnected from the cloud-computing environment, etc. The data structure may include metadata that indicates an Internet Protocol (IP) address or Media Access Control (MAC) address of each client, an identification number of each execution environment, etc. Responsive to user input (e.g., user selection), the rules module 212 may add one or more of the entities to one or more first level access lists (e.g., the whitelist, the blacklist, the flag based list indicative of access permissions).

In some embodiments, the rules may include a second level access list that includes which type of memory access command each entity on the first level access list is allowed to perform. A memory access command is a command to perform a data related operation at an address range of the block device. For example, the types of memory access commands may include read commands, write commands, erase commands, modify commands, etc. The rules module 212 may set which entities are allowed to perform which types of memory access commands. For example, rules module 212 may maintain, in the rules data structure, which entities are allowed access to the block device. For each entity allowed access, rules module 212 may include a bit or metadata indicative of the type of memory commands the entity is allowed to perform on the block device. The second level access list may be maintained by rules module 212 and stored on rules data structure 202.

FIG. 3 schematically illustrates example metadata maintained by the rules module, in accordance with some embodiments of the present disclosure. In some embodiments, rules module 212 may maintain metadata table 300. In some embodiments, metadata table 300 may be stored in rules data structure 202 and can be referenced by rules module 212 to which entities have access to a block device, and what type of memory commands are the allowed entities enabled to perform. As illustrated in FIG. 3, metadata table 300, by way of exemplary example, maintains entries that that correlate each entity with a first level access value, and second level access values. The first level access value may indicate whether the entity is allowed access to the block device. The second level access values indicate what type of memory commands the allowed entities are enabled to perform. For example, execution environment 305, 310, and 315 are listed. Execution environment 305 is allowed access to the block device, and allowed to perform any type of memory command (e.g., write, read, erase, and modify). Execution environment 310 is allowed access to the block device, and allowed to perform only read commands. Execution environment 315 is not allowed access to the block device. In some embodiments, metadata table 300 may be two separate metadata tables. For example, a first metadata table may maintain the first level access values, and a second metadata table may maintain the second level access values.

Returning to FIG. 2, in some embodiments, the first level access list and/or the second level access list may be protected by a security layer. For example, prior to viewing and/or editing the lists, a security prompt may require user input to verify that the user is authorized to access the lists. The security prompt may request a user name, password, token, or any other security measure. Responsive to verifying that the user input is accurate (e.g., the user input matches a stored value), rules module 212 may enable access to the lists. In some embodiments, the lists may be created and/or updated by a client having administrative privileges.

First level access module 214 may restrict access, by an entity, to the block device. In particular, first level access module 214 may listen to network traffic for memory access commands issued and/or received by an execution environment, a host, or a client that refer to an address range associated with the block device. In an example, first level access module 214 may monitor for the memory access commands using a filter, a packet sniffer, a resource monitoring tool, etc. First level access module 214 may capture the memory access commands, transmitted or received by an entity, using the filter(s), the resource monitoring tool(s), or the packet sniffer(s), and determine the address range referred to by the memory access command. Responsive to determining that the address range is associated with the block device, first level access module 214 may determine, using the first level access list, whether the entity that issued the memory access command has access to the block device. If the entity has access to the block device, first level access module 214 may allow the memory access command to process by, for example, not interfering with the memory access command, instructing execution module 218 to process the memory access command, etc. If the entity does not have access to the block device, first level access module 214 may block the memory access command from processing. For example, first level access module 214 may block the memory access command, issue an instruction instructing the cloud-computing environment to not process the memory access command, etc.

Second level access module 216 may restrict access an allowed entity from performing specific types of memory access commands on the block device. In particular, second level access module 216 may monitor a file system mount point associated with the block device. A mount point is a directory in a file system where additional information is logically connected from a storage location outside the operating system's root drive and partition. When the file system (e.g., block device) is mounted to a particular mount point, the memory access commands issued to the block device may be recorded by second level access module 216. Responsive to determining that a memory access command issued to the block device, second level access module 216 may identifying a type of the memory access command that is issued. For example, second level access module 216 may determine whether the issued memory access command is a read command, a write command, an erase command, a modify command, etc. Second level access module 216 may then determine, using the second level access list, whether the entity that issued the memory access command is allowed to access the block device using the type of memory access command. For example, responsive to an execution environment issuing a write command to the block device, second level access module 216 may use the second level access list to determine whether said execution environment may write to the block device. Responsive to determining that the entity may not access the block device with the particular type of memory access command, second level access module 216 may block the memory access command or issue an instruction instructing the cloud-computing environment not to process the memory access command. If the entity is allowed to access to the block device using the particular type of memory access command, second level access module 216 may allow the memory access command to process by, for example, not interfering with the memory access command, instructing execution module 218 to process the memory access command, etc. Although discussed that the first level access module 214 monitors for the memory access commands using a filter, a packet sniffer, or a resource monitoring tool, and the second level access module 216 monitors for the memory access commands using a mount point, it should be understood that either module 214, 216 can use any combination of the monitoring methods discussed.

In some embodiments, first level access module 214 may automatically add a new entity to the first level access list and set access privileges of the new entity. Similarly, second level access module 216 may automatically add the new entity to the second level access list and set access privileges of the new entity. A new entity may be an execution environment, host, or client added to the cloud-computing environment. For example, first level access module 214 may detect a cloned execution environment added to the cloud-computing environment, and add the execution environment to the first level access list as an entity that is denied access to the block device. In another example, second level access module 216 may detect an client added to the cloud-computing environment, instruct the first level access module 214 to add the client to the first level access list as an entity that is allowed access to the block device, and add the client to the second level access list as an entity that is allowed only read privileges to the block device.

In an illustrative example, a cluster (a distributed computing architecture in which the nodes share same disk devices but each execution environment has its own memory) may use a cluster quorum disk. A cluster quorum disk is the storage medium on which the configuration database is stored for a cluster computing. Each node may share the cluster quorum disk and have access to it. Accordingly, embodiments of the present disclosure enable a client (such as an administrator) to set rules regarding which execution environment may access to a cluster quorum disk, and what kind of access type each execution environment is allowed.

In some embodiments, access to a block device may be limited by client keys, passwords, etc. An execution environment with access to the block device may be cloned. Accordingly, to prevent the clone execution environment from accessing the block device using the client keys or passwords, the embodiments of the present disclosure may enable the cloned execution environment to automatically be prevented access to the block device. A client device may then set access permissions for the cloned execution environment.

Figure 4:
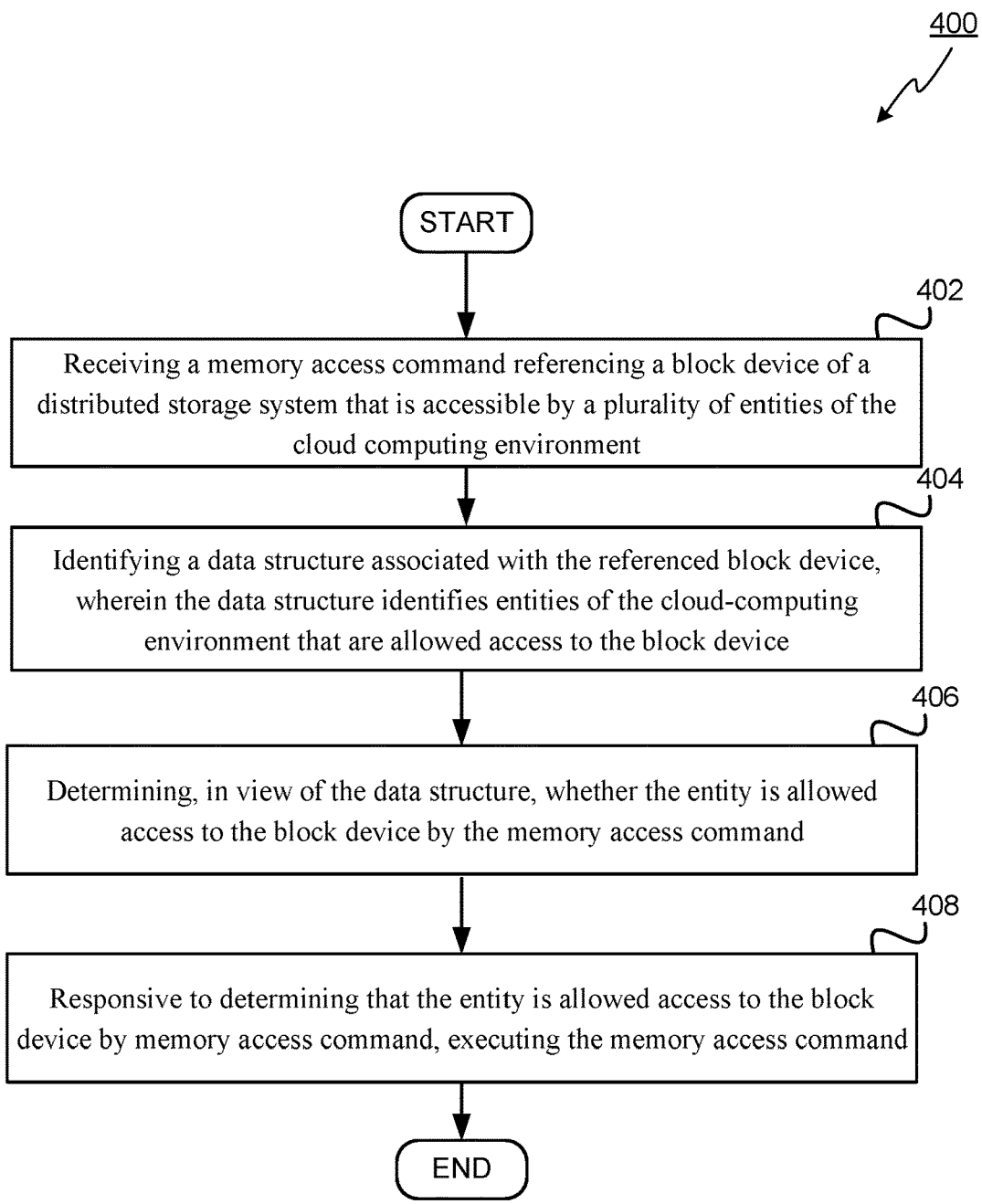
FIG. 4 depicts a flow diagram of a method for managing access to a block device, in accordance with one or more aspects of the present disclosure.

FIG. 4 depicts a flow diagram of an illustrative example of a method 400 for managing access to a block device, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a kernel or by executable code of a host machine (e.g., host operating system or firmware), a virtual machine (e.g., guest operating system or virtual firmware), other executable code, or a combination thereof.

Method 400 may be performed by processing devices of a server device or a client device and may begin at operation 402. At operation 402, the server or client device may receive, from an entity operating in a cloud-computing environment, a memory access command referencing a block device of a distributed storage system that is accessible by a plurality of entities of the cloud computing environment. In some embodiments, the entity is an execution environment, a client, or a host system.

At operation 404, the server or client device may identify a data structure associated with the referenced block device. The data structure may identify entities of the cloud-computing environment that are allowed access to the block device. In some embodiments, the server or client device may maintain metadata, in the data structure, indicative of access permissions for each memory access command type by the entity with respect to the block device.

At operation 406, the server or client device may determine, in view of the data structure, whether the entity is allowed access to the block device by the memory access command. In some embodiments, the server or client device may determine, in view of the data structure, whether the entity is allowed access to the block device by a type of the memory access command. The type of the memory access command may be at least one of a read command, a write command, modify command, or an erase command.

At operation 408, responsive to determining that the entity is allowed access to the block device by memory access command, the server or client device may execute the memory access command. In some embodiments, responsive to determining that the entity does not have access to the block device, the server or client device may deny access to the block device. In some embodiments, responsive to determining that the entity is not allowed access to the block device using the type of memory access command, the server or client device may deny access to the block device. In some embodiments, the server or client device may detect a new entity added to the cloud-computing environment and add, to the data structure, metadata indicative of access permissions by the new entity with respect to the block device. The new entity may be a clone of the entity and references the block device. Responsive to completing the operations described herein above with references to operation 408, the method may terminate.

Figure 5:
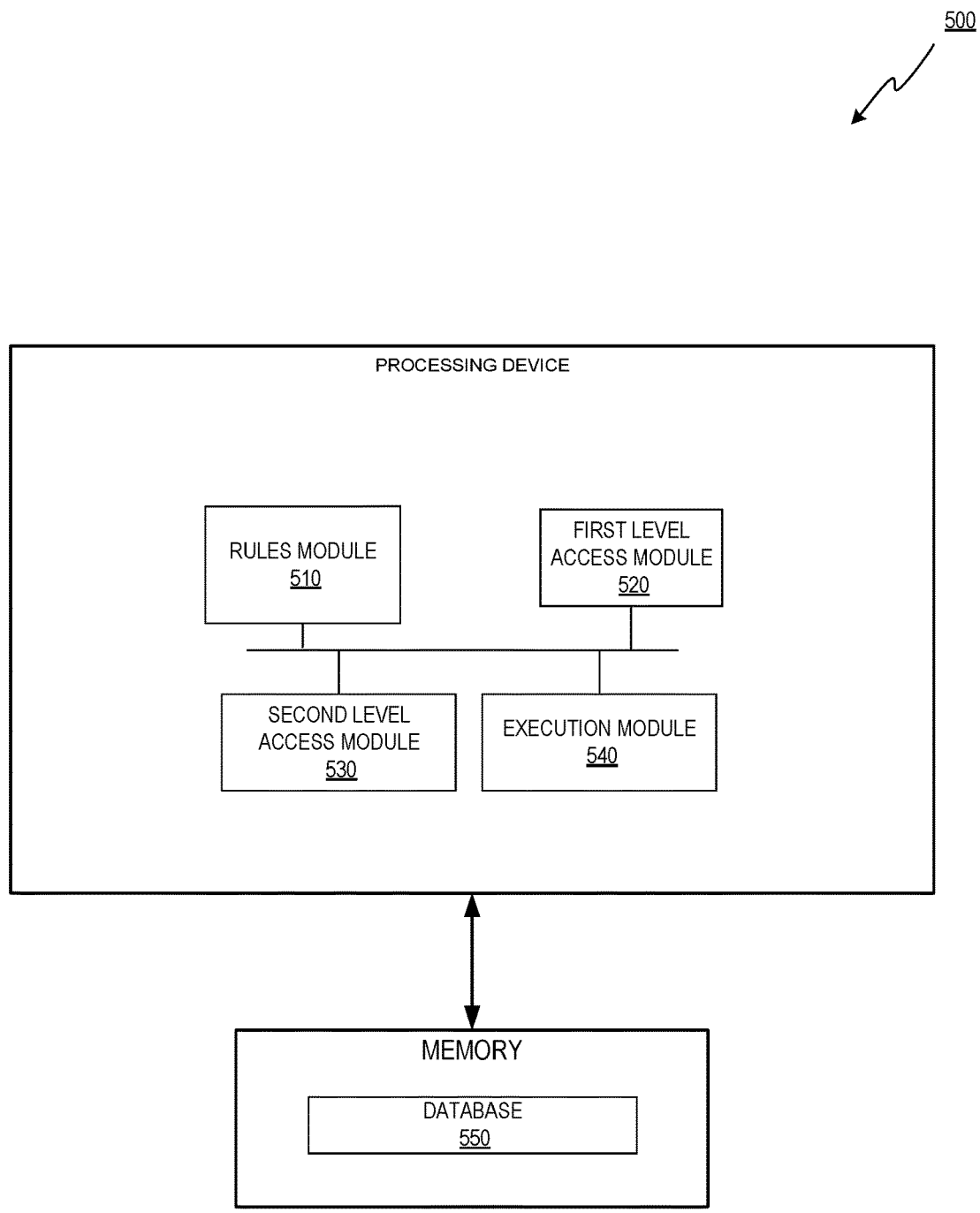
FIG. 5 depicts a block diagram of an example computer system in accordance with one or more aspects of the present disclosure.

FIG. 5 depicts a block diagram of a computer system 500 operating in accordance with one or more aspects of the present disclosure. Computer system 500 may be the same or similar to computer system 200 and computing device 100 and may include one or more processing devices and one or more memory devices. In the example shown, computer system 500 may include rules module 510, first level access module 520, second level access module 530, execution module 540, and database 550. In some implementations, rules module 510 may correspond to rules module 212 of FIG. 2, first level access module 520 may correspond to first level access module 214 of FIG. 2, second level access module 530 may correspond to second level access module 216 of FIG. 2, and execution module 540 may correspond to execution module 218 of FIG. 2.

Rules module 510 may maintain metadata, in a data structure (e.g., database 550), indicative of access permissions for each memory access command type by the entity with respect to the block device.

First level access module 520 receive, from an entity operating in a cloud-computing environment, a memory access command referencing a block device of a distributed storage system that is accessible by a plurality of entities of the cloud computing environment. In some embodiments, the entity is an execution environment, a client, or a host system. First level access module 520 may identify a data structure associated with the referenced block device. The data structure may identify entities of the cloud-computing environment that are allowed access to the block device. First level access module 520 may determine, in view of the data structure, whether the entity is allowed access to the block device by the memory access command. In some embodiments, second level access module 530 may determine, in view of the data structure, whether the entity is allowed access to the block device by a type of the memory access command. The type of the memory access command may be at least one of a read command, a write command, modify command, or an erase command.

Responsive to determining that the entity is allowed access to the block device by memory access command, first level access module 520 may send an instruction to execution module 540 to execute the memory access command. In some embodiments, responsive to determining that the entity is allowed access to the block device by the type of memory access command, second level access module 530 may send an instruction to execution module 540 to execute the memory access command. In some embodiments, responsive to determining that the entity does not have access to the block device, first level access module 520 may deny access to the block device. In some embodiments, responsive to determining that the entity is not allowed access to the block device using the type of memory access command, second level access module 530 may deny access to the block device.

In some embodiments, first level access module 520 and/or second level access module 530 may detect a new entity added to the cloud-computing environment and instruct rules module 510 to add, to the data structure, metadata indicative of access permissions by the new entity with respect to the block device. The new entity may be a clone of the entity and references the block device.

Figure 6:
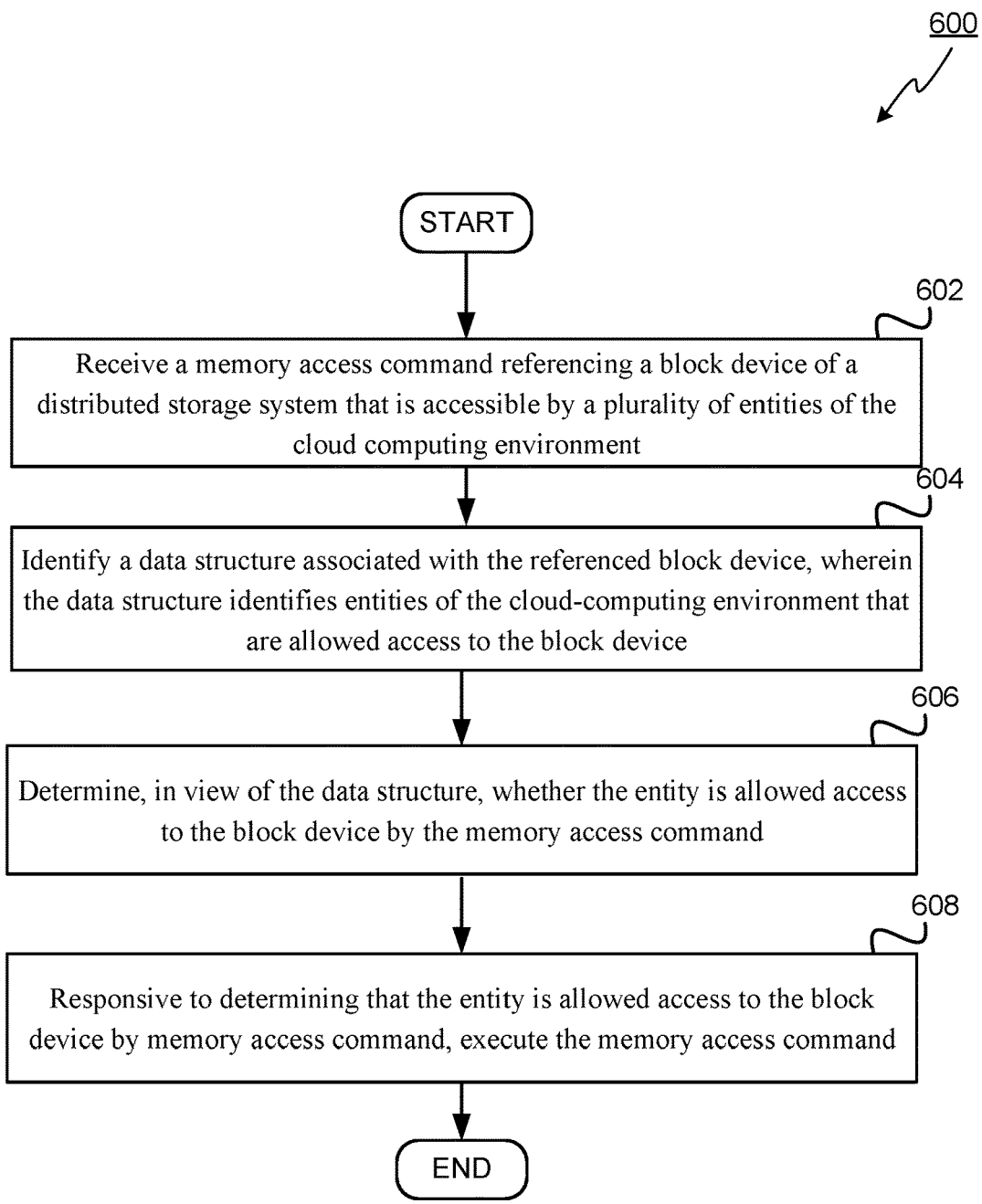
FIG. 6 depicts a flow diagram of a method for managing access to a block device, in accordance with one or more aspects of the present disclosure.

FIG. 6 depicts a flow diagram of one illustrative example of a method 600 for managing access to a block device, in accordance with one or more aspects of the present disclosure. Method 600 may be similar to method 400 and may be performed in the same or a similar manner as described above in regards to method 400. Method 600 may be performed by processing logic of a server device or a client device and may begin at operation 602.

At operation 602, processing logic may receive, from an entity operating in a cloud-computing environment, a memory access command referencing a block device of a distributed storage system that is accessible by a plurality of entities of the cloud computing environment. In some embodiments, the entity is an execution environment, a client, or a host system.

At operation 604, the processing logic may identify a data structure associated with the referenced block device. The data structure may identify entities of the cloud-computing environment that are allowed access to the block device. In some embodiments, the processing logic may maintain metadata, in the data structure, indicative of access permissions for each memory access command type by the entity with respect to the block device.

At operation 606, the processing logic may determine, in view of the data structure, whether the entity is allowed access to the block device by the memory access command. In some embodiments, the processing logic may determine, in view of the data structure, whether the entity is allowed access to the block device by a type of the memory access command. The type of the memory access command may be at least one of a read command, a write command, modify command, or an erase command.

At operation 608, responsive to determining that the entity is allowed access to the block device by memory access command, the processing logic may execute the memory access command. In some embodiments, responsive to determining that the entity does not have access to the block device, the processing logic may deny access to the block device. In some embodiments, responsive to determining that the entity is not allowed access to the block device using the type of memory access command, the processing logic may deny access to the block device. In some embodiments, the processing logic may detect a new entity added to the cloud-computing environment and add, to the data structure, metadata indicative of access permissions by the new entity with respect to the block device. The new entity may be a clone of the entity and references the block device. Responsive to completing the operations described herein above with references to operation 608, the method may terminate.

Figure 7:
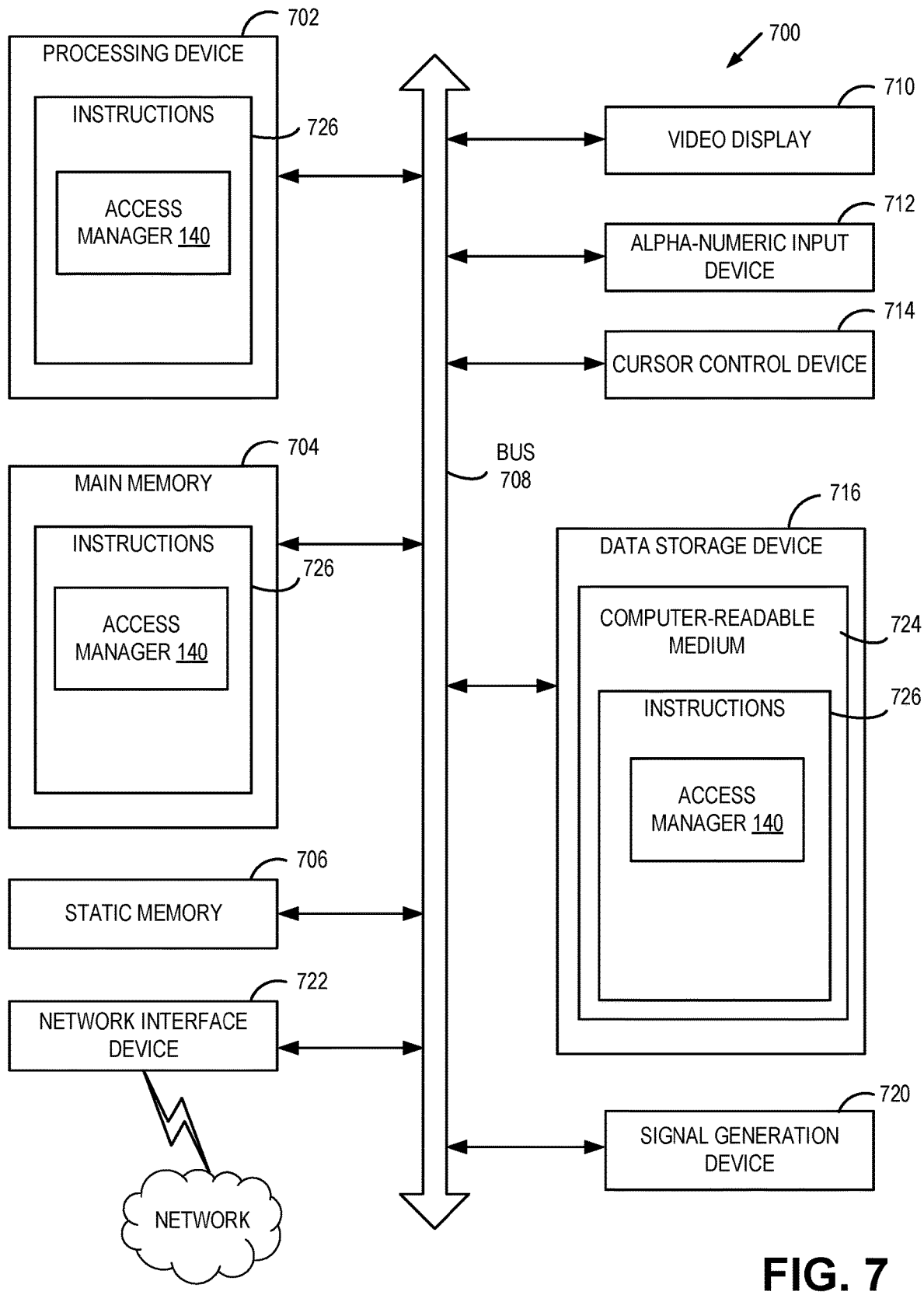
FIG. 7 depicts a block diagram of an illustrative computer system operating in accordance with one or more aspects of the present disclosure.

FIG. 7 depicts an example computer system 700 which can perform any one or more of the methods described herein. In one example, computer system 700 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 700 includes a processing device 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic (e.g., instructions 726) that includes access manager 140 for performing the operations and steps discussed herein (e.g., corresponding to the methods of FIGS. 4 and 6, etc.).

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker). In one illustrative example, the video display unit 710, the alphanumeric input device 712, and the cursor control device 714 may be combined into a single component or device (e.g., an LCD touch screen).

The data storage device 716 may include a non-transitory computer-readable medium 724 on which may store instructions 726 that include duplication manager 140 (e.g., corresponding to the method of FIGS. 4 and 6, etc.) embodying any one or more of the methodologies or functions described herein. Access manager 140 may also reside, completely or at least partially, within the main memory 704 and/or within the processing device 702 during execution thereof by the computer system 700, the main memory 704 and the processing device 702 also constituting computer-readable media. Duplication manager 140 may further be transmitted or received over a network via the network interface device 722.

While the computer-readable storage medium 724 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some execution environments, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "determining," "executing," "rejecting," "provisioning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, execution environment, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing execution environments. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first,"

"second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 or 600 and one or more of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    capturing, by a processing device monitoring network traffic from an entity of a plurality of entities operating in a cloud-computing environment, a memory access command of a particular type, the memory access command referencing an address range;
    determining that the address range is associated with a block device of a distributed storage system that is accessible by the plurality of entities;
    identifying a data structure associated with the block device, wherein the data structure identifies entities of the cloud-computing environment that are allowed access to the block device;
    determining, in view of first metadata maintained in the data structure, whether the entity is allowed access to the block device by the memory access command;
    responsive to determining that the entity is allowed access to the block device by the memory access command, determining, in view of second metadata maintained in the data structure, whether the entity is allowed access to the block device by the type of the memory access command; and
    responsive to determining that the entity is allowed access to the block device by the type of the memory access command, executing the memory access command.

2. The method of claim 1, further comprising;
    detecting a new entity added to the cloud-computing environment; and
    adding, to the data structure, metadata indicative of access permissions by the new entity with respect to the block device.

3. The method of claim 2, wherein the new entity is a clone of the entity and references the block device.

4. The method of claim 1, further comprising:
    maintaining metadata, in the data structure, indicative of access permissions for each memory access command type by the entity with respect to the block device.

5. The method of claim 1,
    wherein the type of the memory access command comprises at least one of a read command, a write command, modify command, or an erase command.

6. The method of claim 5, further comprising:
    responsive to determining that the entity is not allowed access to the block device using the type of memory access command, denying access to the block device.

7. The method of claim 1, further comprising:
    responsive to determining that the entity does not have access to the block device, denying access to the block device.

8. The method of claim 1, wherein the entity comprises an execution environment, a client, or a host system.

9. The method of claim 1, wherein a client of a plurality of clients operating in a cloud-computing environment is enabled to set access permissions in the data structure.

10. A system comprising: a memory; and
    a processing device, operatively coupled to the memory, the processing device configured to:
    capture, by monitoring network traffic from an entity of a plurality of entities operating in a cloud-computing environment, a memory access command of a particular type, the memory access command referencing an address range;
    determine that the address range is associated with a block device of a distributed storage system that is accessible by the plurality of entities;
    identify a data structure associated with the block device, wherein the data structure identifies entities of the cloud-computing environment that are allowed access to the block device;
    determine, in view of first metadata maintained in the data structure, whether the entity is allowed access to the block device by the memory access command;
    responsive to determining that the entity is allowed access to the block device by the memory access command, determining, in view of second metadata maintained in the data structure, whether the entity is allowed access to the block device by the type of the memory access command; and
    responsive to determining that the entity is allowed access to the block device by the type of the memory access command, execute the memory access command.

11. The system of claim 10, wherein the processing device is further configured to;
    detect a new entity added to the cloud-computing environment; and
    add, to the data structure, metadata indicative of access permissions by the new entity with respect to the block device.

12. The system of claim 11, wherein the new entity is a clone of the entity and references the block device.

13. The system of claim 10, wherein the processing device is further configured to:
    maintain metadata, in the data structure, indicative of access permissions for each memory access command type by the entity with respect to the block device.

14. The system of claim 10,
    wherein the type of the memory access command comprises at least one of a read command, a write command, modify command, or an erase command.

15. The system of claim 14, wherein the processing device is further configured to:
responsive to determining that the entity is not allowed access to the block device using the type of memory access command, deny access to the block device.

16. The system of claim 10, wherein the processing device is further configured to:
responsive to determining that the entity does not have access to the block device, deny access to the block device.

17. The system of claim 10, wherein the entity comprises an execution environment, a client, or a host system.

18. The system of claim 10, wherein a client of a plurality of clients operating in a cloud-computing environment is enabled to set access permissions in the data structure.

19. A non-transitory computer readable medium comprising instructions, which when accessed by a processing device, cause the processing device to:
capture, by monitoring network traffic from an entity of a plurality of entities operating in a cloud-computing environment, a memory access command of a particular type, the memory access command referencing an address range;
determine that the address range is associated with a block device of a distributed storage system that is accessible by the plurality of entities;
identify a data structure associated with the block device, wherein the data structure identifies entities of the cloud-computing environment that are allowed access to the block device;
determine, in view of first metadata maintained in the data structure, whether the entity is allowed access to the block device by the memory access command;
responsive to determining that the entity is allowed access to the block device by the memory access command, determining, in view of second metadata maintained in the data structure, whether the entity is allowed access to the block device by the type of the memory access command; and
responsive to determining that the entity is allowed access to the block device by the type of the memory access command, execute the memory access command.

20. The non-transitory computer readable medium of claim 19, wherein the processing device is further configured to:
detect a new entity added to the cloud-computing environment; and
add, to the data structure, metadata indicative of access permissions by the new entity with respect to the block device.

* * * * *